(12) United States Patent
Radford et al.

(10) Patent No.: US 11,996,739 B2
(45) Date of Patent: May 28, 2024

(54) CURVED MAGNETS FOR A VARIABLE-FLUX MEMORY MOTOR

(71) Applicant: Jacobi Motors LLC, Webster, TX (US)

(72) Inventors: Nicolaus Radford, Webster, TX (US); Mohammadreza Barzegaranbaboli, Webster, TX (US)

(73) Assignee: Jacobi Motors LLC, Webster, TX (US)

(*) Notice: Subject to any disclaimer, the term of this patent is extended or adjusted under 35 U.S.C. 154(b) by 101 days.

(21) Appl. No.: 17/431,080

(22) PCT Filed: Jan. 11, 2021

(86) PCT No.: PCT/US2021/012938
§ 371 (c)(1),
(2) Date: Aug. 13, 2021

(87) PCT Pub. No.: WO2021/142433
PCT Pub. Date: Jul. 15, 2021

(65) Prior Publication Data
US 2022/0407374 A1 Dec. 22, 2022

Related U.S. Application Data

(60) Provisional application No. 62/958,869, filed on Jan. 9, 2020.

(51) Int. Cl.
*H02K 1/27* (2022.01)
*H02K 1/02* (2006.01)
(Continued)

(52) U.S. Cl.
CPC ............. *H02K 1/2766* (2013.01); *H02K 1/02* (2013.01); *H02K 1/2781* (2022.01)

(58) Field of Classification Search
CPC .......... H02K 1/02; H02K 1/27; H02K 1/2766; H02K 1/2781
(Continued)

(56) References Cited

U.S. PATENT DOCUMENTS

| 7,598,645 B2 * | 10/2009 | Ley | H02K 1/2766 |
| | | | 310/156.56 |
| 2006/0170301 A1 * | 8/2006 | Masuzawa | H02K 1/276 |
| | | | 310/156.53 |

(Continued)

FOREIGN PATENT DOCUMENTS

| EP | 3032718 A1 | 6/2016 |
| EP | 3561999 A1 | 10/2019 |
| WO | 2008/062543 A1 | 5/2008 |

OTHER PUBLICATIONS

Hai Xu et al., "Design of a Hybrid Magnets Variable Flux Memory Machine Based on Hysteresis Model," 2019 IEEE International Electric Machines & Drives Conference (IEMDC); pp. 1889-1894; dated May 12, 2019 (6 pages).

(Continued)

*Primary Examiner* — Rashad H Johnson
(74) *Attorney, Agent, or Firm* — David L. Cohen

(57) ABSTRACT

A multi-pole rotor of a variable-flux memory motor (VFMM) includes: a plurality of poles. Each pole includes: a curved soft magnet, wherein an outer periphery of the curved soft magnet is toward the rotational axis of the rotor; a first non-magnetic and non-conductive material disposed on the outer periphery of the curved soft magnet; and a second non-magnetic and non-conductive material disposed on an inner periphery of the curved soft magnet.

17 Claims, 7 Drawing Sheets

(51) Int. Cl.
*H02K 1/276* (2022.01)
*H02K 1/2781* (2022.01)

(58) Field of Classification Search
USPC .................................................. 310/156.53
See application file for complete search history.

(56) References Cited

U.S. PATENT DOCUMENTS

| | | | |
|---|---|---|---|
| 2012/0217834 A1* | 8/2012 | Lutz .................... | H02K 1/2753 |
| | | | 29/598 |
| 2019/0173336 A1* | 6/2019 | Takeuchi ............... | H02K 1/246 |
| 2019/0296594 A1* | 9/2019 | Nashiki .................... | H02K 1/27 |
| 2020/0014289 A1* | 1/2020 | Ko ....................... | H02K 21/029 |
| 2021/0265880 A1* | 8/2021 | Shinji .................... | H02K 1/276 |
| 2022/0006358 A1* | 1/2022 | Takahashi .......... | H02K 11/0094 |
| 2022/0407374 A1* | 12/2022 | Radford ............... | H02K 1/2766 |
| 2023/0361635 A1* | 11/2023 | Senti ...................... | H02K 1/278 |

OTHER PUBLICATIONS

International Search Report issued in corresponding International Patent Application No. PCT/US2021/012938 dated May 11, 2021 (4 pages).
Written Opinion issued in corresponding International Patent Application No. PCT/US2021/012938 dated May 11, 2021 (8 pages).

* cited by examiner

Curved Design Geometries

| $r_{ia}$(mm) | $r_{oa}$(mm) | $r_{ib}$(mm) | $r_{ob}$(mm) | Id (A) | H (kA/m) | MS (%) |
|---|---|---|---|---|---|---|
| 2.88 | 7 | 9.8 | 16.8 | 1500 | 76 | 100 |
| 7 | 7 | 6 | 13.76 | 1500 | 84 | 97 |
| 3 | 6 | 8 | 15.25 | 1500 | 81.5 | 100 |
| 4 | 7 | 8 | 15.45 | 1500 | 82 | 98.5 |
| 3 | 8 | 12 | 18.455 | 1500 | 71 | 97 |
| 2.88 | 7 | 9.8 | 16.8 | 1000 | 60 | 80 |
| 2.88 | 7 | 9.8 | 16.8 | 500 | 44 | 24 |

US 11,996,739 B2

CURVED MAGNETS FOR A VARIABLE-FLUX MEMORY MOTOR

CROSS REFERENCE TO RELATED APPLICATIONS

This application claims priority, pursuant to 35 U.S.C. § 119(e), to U.S. Provisional Application No. 62/958,869 entitled, "CURVED MAGNETS FOR A VARIABLE-FLUX MEMORY MOTOR," filed on Jan. 9, 2020. The contents of which are hereby incorporated by reference in its entirety.

BACKGROUND

Synchronous electric motors with permanent magnets such as variable-flux memory motors have a wide range of applications in industrial, commercial, and residential, applications, such as fans, pumps, compressors, elevators, and refrigerators, industrial machinery, and electric motor vehicles because of their high efficiencies. Also, because of using permanent magnets instead of windings in the rotors of the synchronous electric motors, there is no need for a rotor cooling. These advantages along with others (e.g., being brushless) make the synchronous electric motors popular where high torque, high efficiency, or low maintenance for electric motors is needed.

SUMMARY

In one aspect, embodiments of the invention are about a multi-pole rotor of a variable-flux memory motor (VFMM) that includes: a plurality of poles. Each pole includes: a curved soft magnet, wherein an outer periphery of the curved soft magnet is toward the rotational axis of the rotor; a first non-magnetic and non-conductive material disposed on the outer periphery of the curved soft magnet; and a second non-magnetic and non-conductive material disposed on an inner periphery of the curved soft magnet.

In another aspect, embodiments of the invention are about a multi-pole rotor of a VFMM that includes a plurality of poles. Each pole includes: a soft magnet; two high-permeable parts disposed on opposite sides of the soft magnet, wherein the soft magnet and the two high-permeable parts create a curved part, and an outer periphery of the curved part is toward the rotational axis of the rotor; a first non-magnetic and non-conductive material disposed on the outer periphery of the curved part; and a second non-magnetic and non-conductive material disposed on an inner periphery of curved part.

Other aspects of the invention will be apparent from the following description and the appended claims.

DETAILED DESCRIPTION

Figure 1:
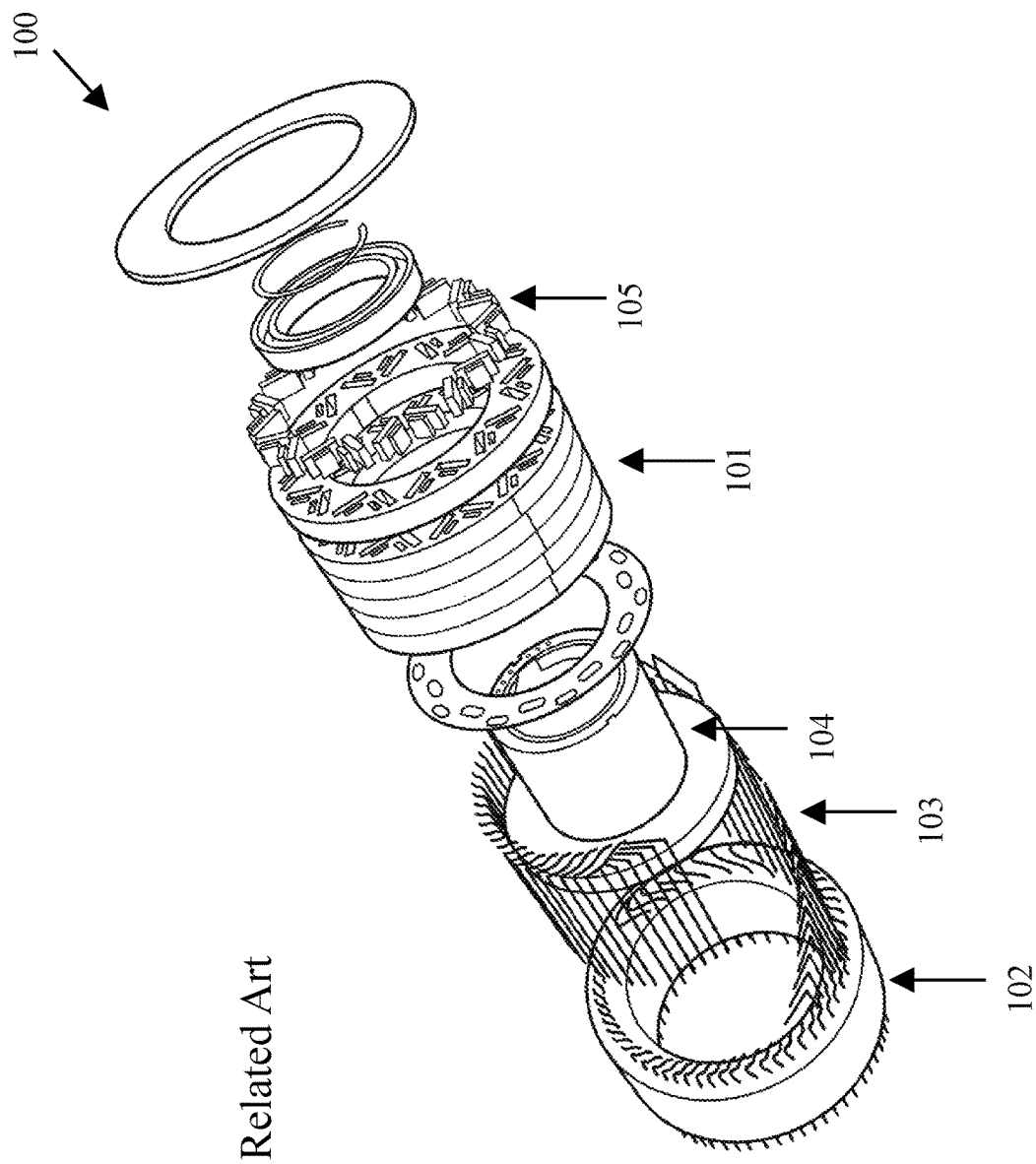
FIG. 1 shows a synchronous electric motor.

This Application discloses improvements to U.S. patent application Ser. No. 16/383,274 entitled "A VARIABLE-FLUX MEMORY MOTOR AND METHODS OF CONTROLLING A VARIABLE-FLUX MOTOR" and filed on Apr. 12, 2019, U.S. Provisional Application No. 62/926,111 entitled "A VARIABLE-FLUX MEMORY MOTOR" and filed on Oct. 25, 2019, and U.S. Provisional Application No. 62/926,126 entitled "METHOD OF MAGNETIZING AND CONTROLLING A VARIABLE-FLUX MEMORY MOTOR" and filed on Oct. 25, 2019, which are incorporated by reference in their entireties.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it would have been apparent to one of ordinary skill in the art that the invention may be practiced without these specific details. In other instances, well-known features have not been described in detail to avoid unnecessarily complicating the description.

FIG. 1 shows an exploded view of a synchronous electric motor (100) (hereinafter, will be referred to as "synchronous motor") including a rotor (101), a stator (102), and stator windings (103) arranged around a rotor hub (104). The synchronous motor may also include a terminal box for connecting input power, a cooling fan, a rotor position sensor, temperature sensors, liquid cooling housings, etc. The rotor (101) includes multiple poles, each including permanent magnets (105) (PM).

The synchronous motor (100) operates via a three-phase AC input, in which each phase is delayed from the other two phases by 120 degrees. To create the three-phase AC input, a power converter may convert DC power fed to the power converter from a high voltage DC source (e.g., a battery). By applying the three-phase AC input to the synchronous motor, the stator windings create a three-phase magnetic field that interacts with the magnetic fields of the PMs (105) and cause the rotor (101) to rotate with a fixed number of revolutions per minute (RPM) speed in a steady-state (hereinafter, will be referred to as "RPM"). The RPM of the synchronous motor is fixed to limiting factors such as number of poles, available voltage, and flux linkage ($\lambda$m), which is provided and is fixed by the PMs. Synchronous motors have a wide range of applications in industrial, commercial, and residential, applications, such as fans, pumps, compressors, elevators, and refrigerators, industrial machinery, and electric vehicles.

In one or more embodiments, because the $\lambda_m$ provided by the PMs is fixed, the synchronous motors with PMs have a narrow constant power speed ratio (CPSR), which is the speed range at which the drive of the motor can maintain a constant power with limited values of input voltage and current of the motor. Thus, increasing the CPSR of the synchronous motors without using advanced control techniques such as implementing flux-weakening control methods is difficult. Because of the narrow range of CPSR for the synchronous motors, using a transmission system may be required to change a CPSR of a system driven by the synchronous motor. Even using such advanced methods extend the CPSR of the synchronous motors to only 2 to 3. On the other hand, the CPSR of the VFMM according to one or more embodiments may achieve 4 to 6.

In general, embodiments of the invention relate to designs of rotors for VFMMs. A VFMM is a type of synchronous motor in which magnetization of rotor magnets (RM) of the VFMM can be adjusted (i.e., changed) during an operation of the VFMM. The adjustment of the magnetization of the RMs (hereinafter, will be referred to as "VFMM magnetization" for simplicity) changes the RPM of the VFMM. According to one or more embodiments, to facilitate the change in the VFMM magnetization, the RMs are made of a soft-ferromagnetic material such as aluminum nickel cobalt (AlNiCo) or some types of ceramics. Hereinafter, an RM made of a soft-ferromagnetic material will be referred to as "soft magnet," which is a low coercive force magnet.

According to one or more embodiments, the soft magnets may be AlNiCo with grades 1-9 or magnets comprised of AlNiCo, cast, ceramics, some grades of samarium cobalt, or sintered construction of these materials. It is apparent that one of ordinary skill in the art could use specific amounts of these materials to achieve a desired function of the VFMM.

The VFMM in accordance with one or more embodiments may be an improved substitute to a synchronous motor because a maximum achievable RPM with a limited voltage of the VFMM may be more efficiently attained through changing the VFMM magnetization. In other words, the CPSR of the VFMM could have a wider range compared to the CPSR of the synchronous motor. Thus, there is no need to couple the transmission system to the VFMM. Consequently, according to one or more embodiments, using the VFMM potentially reduces manufacturing costs of electric motor-equipped systems due to being magnetized or demagnetized during assembly.

Soft-ferromagnetic materials have high permeability (same as hard-ferromagnetic materials such as alloys of iron and nickel) but low coercivity (unlike hard-ferromagnetic materials). Because of the low coercivity of soft-ferromagnetic materials, changing the magnetization of soft-ferromagnetic materials requires relatively smaller magnetic field compared to hard-ferromagnetic materials.

In one or more embodiments, only soft magnets may be used as the magnets of the rotor of the VFMM and there may be no hard magnets (i.e., magnets made of hard-ferromagnetic materials) mounted on the rotor. Alternatively, in one or more embodiments, both of the soft magnets and hard magnets may be used as the magnets of the rotor of the VFMM. Embodiments of the invention may have advantages over synchronous motors, which use only hard magnets, because hard magnets are made of rare-earth-materials and are significantly more expensive than soft magnets (e.g., AlNiCo). Thus, partially or entirely using soft magnets instead of hard magnets in the VFMM significantly reduces manufacturing costs of the VFMM compared to traditional synchronous motors.

Additionally, another advantage of using the soft magnets is that control and change of the overall magnetization of the overall magnets of the VFMM can be done in a wide range. According to one or more embodiments, the overall magnetization of the soft magnets can be changed to any value from 0% magnetization (i.e., the soft magnets are completely demagnetized) to 100% magnetization (i.e., the soft magnets are magnetized to their maximum capacity). This change in magnetization may occur in a short time (e.g., about 1 millisecond).

In contrast, hard magnets do not tend to change their magnetization easily. Accordingly, changing the magnetization of hard magnets requires significantly more power than the operating power of a VFMM or other types of synchronous motors. For example, changing magnetization of hard magnets, such as some grades of neodymium iron boron (NdFeB) and samarium cobalt (SmCo) may require a power more than 10 folds higher that a power required for changing magnetization of the soft magnets. Thus, if the hard magnets are used in the VFMM, the magnetization of the hard magnets cannot be changed, unless a high current is applied to the stator windings. However, such a high current may damage the windings or other components of the electric motor.

According to one or more embodiments, if a current that is significantly higher than operational current of the stator windings passes the stator windings, this current may temporarily change the magnetization of the soft magnets to an unwanted value. This current (hereinafter, will be referred to as the "glitch current") may be generated due to an unwanted glitch in the VFMM or a controller that controls the VFMM. However, it will be easy to revive the magnetization of the soft magnets by another current that is bearable by the stator windings. No matter how high the glitch current be, the magnetization of the soft magnets can be revived via a relatively smaller current than the glitch current because soft magnets can easily accept a different magnetization (compared to hard magnets).

In one or more embodiments, a certain number or amount of hard magnets may be used to create a magnetization baseline for the VFMM. Because the magnetization of the hard magnets is reluctant to change, the magnetization of the hard magnets will be the magnetization baseline, and the magnetization of the soft magnets will change the overall magnetization from the magnetization baseline (to higher or lower magnetization from the baseline, depending on the torque and RPM of the VFMM).

Figure 2A:
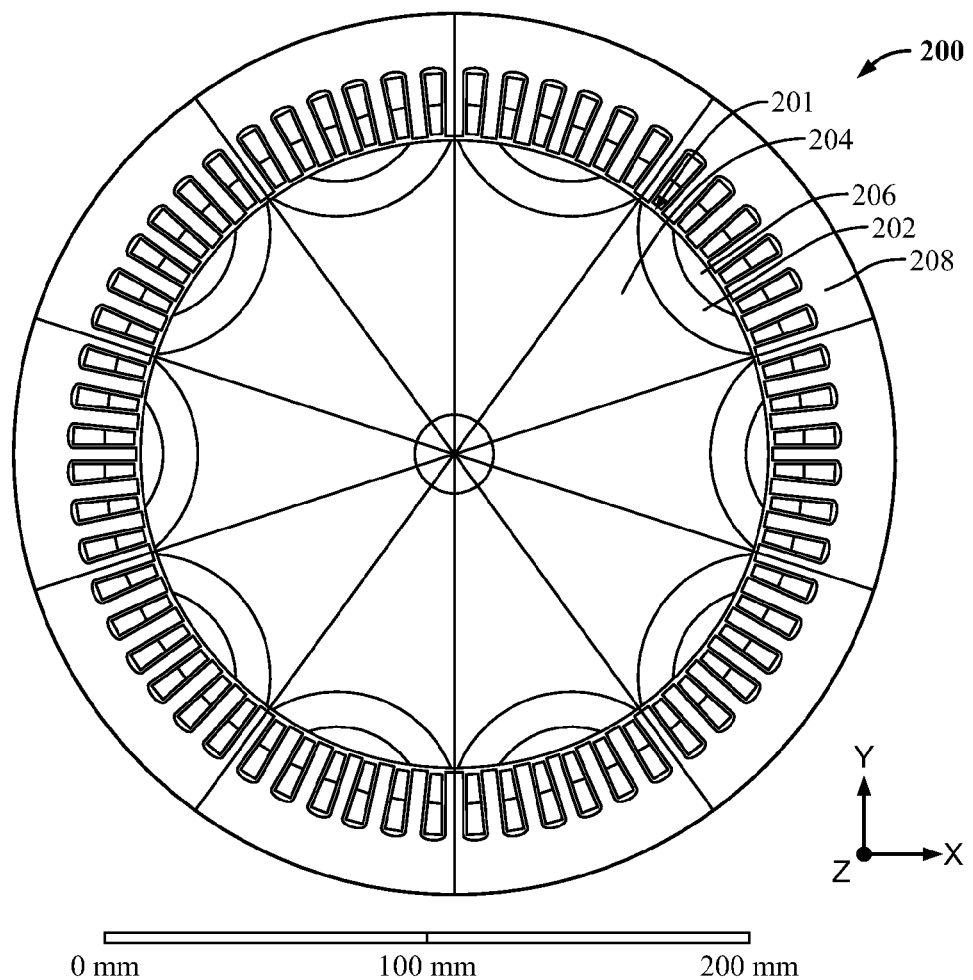
FIG. 2A shows a cross-sectional view of a variable-flux memory motor (VFMM) in accordance with one or more embodiments of the invention.
Figure 2B:
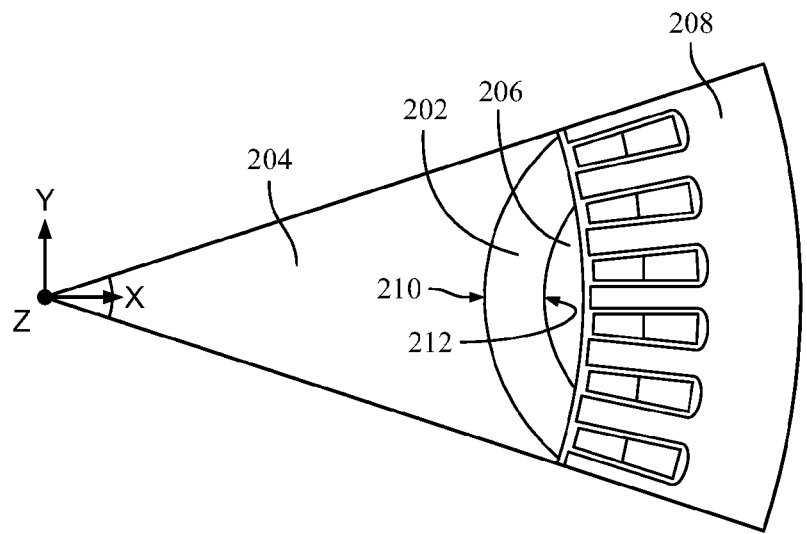
FIG. 2B shows a cross-sectional view of a pole of the VFMM shown in FIG. 2A.

FIGS. 2A-2B show cross-sectional views of the VFMM (200) and a pole of the VFMM (200), respectively. The VFMM (200) of FIG. 2A includes a stator (208) that holds stator windings in slots between adjacent stator teeth. A rotor (201) of the VFMM (200) includes soft magnets (202) that are mounted on a rotor core (204). The rotor (201) is mounted on a shaft and rotates around the rotational axis ("Z" axis in FIGS. 2A-2B) of the rotor (201).

As shown in FIG. 2B, each of the soft magnets (202) has a curved shape such that an outer periphery of the soft magnet (210) is toward the rotational axis of the rotor (201). Accordingly, an inner periphery of the soft magnet (212) is toward outside of the rotor (201).

According to one or more embodiments, at least a portion of the rotor core (204) that is in contact with the soft magnets (202) or the entire rotor core (204) may be non-magnetic and non-conductive (i.e., a first non-magnetic and non-conductive material). A second non-magnetic and non-conductive material (206) may be disposed on the inner peripheries of the soft magnets (212). The non-magnetic and non-conductive materials may be, but are not limited to, plastic, resin, air, or vacuum.

According to one or more embodiments, because of the curved shape of the soft magnets (202), the magnetic flux created by the stator windings propagates in the soft magnets (202) more homogenously. This helps containing the magnetic flux inside the soft magnets (202). Thus, the curved soft magnets (202) can be magnetized more efficiently. In one or more embodiments, the thickness of the curved shape of the soft magnets (202) is not uniform throughout the shape, such that the eclipse ratio of the inner layer is not equal to the eclipse ratio of the outer layer. These aspects of the curved design are made more clear by the magnetization data for working examples of various configurations of the curved magnet geometry presented in FIG. 6.

Figure 3:
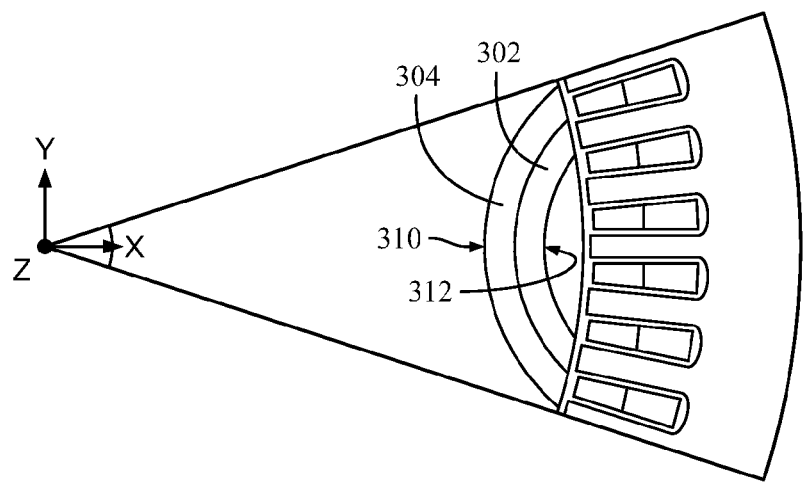
FIG. 3 shows a cross-sectional view of a pole of a VFMM in accordance with one or more embodiments of the invention.

FIG. 3 shows another example of the curved soft magnet. According to FIG. 3, the curved soft magnet may include an inner soft magnet (302) (i.e., a first curved soft magnet) toward the inner periphery of the soft magnet (312) and an outer soft magnet (304) (i.e., a second curved soft magnet) toward the outer periphery of the soft magnet (310). According to one or more embodiments, a magnetic permeability of the inner soft magnet (302) may be higher than a magnetic permeability of the outer soft magnet (304).

According to one or more embodiments, segmenting the soft magnet into the inner soft magnet (302) and outer soft magnet (304) helps containing the magnetic flux inside the soft magnet. This way, the soft magnet can be magnetized more efficiently.

Figure 4A:
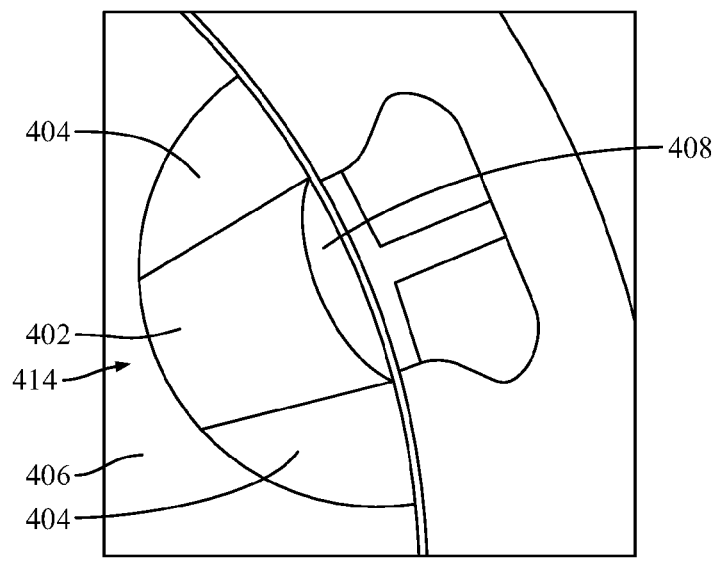
FIG. 4A shows a cross-sectional view of a pole of a VFMM in accordance with one or more embodiments of the invention.

According to one or more embodiments, a high-permeable material, such as M19, may be used in conjunction with the soft magnet to help directing the magnetic flux toward the soft magnet. For example, FIG. 4A shows a pole of a rotor where two high-permeable parts (404) are disposed on opposite sides of a soft magnet (402) such that the combination of the high-permeable parts (404) and the soft magnet (402) create a curved part. The curved part may be interposed between a first non-magnetic and non-conductive material (406) and a second non-magnetic and non-conductive material (408). The outer periphery (414) of the curved part is toward the rotational axis of the rotor. As shown in FIG. 4A, the high-permeable parts (404) direct the magnetic flux to the soft magnet (402), and accordingly, minimize shunt of magnetic flux into non-magnetic portions of the rotor.

Figure 4B:
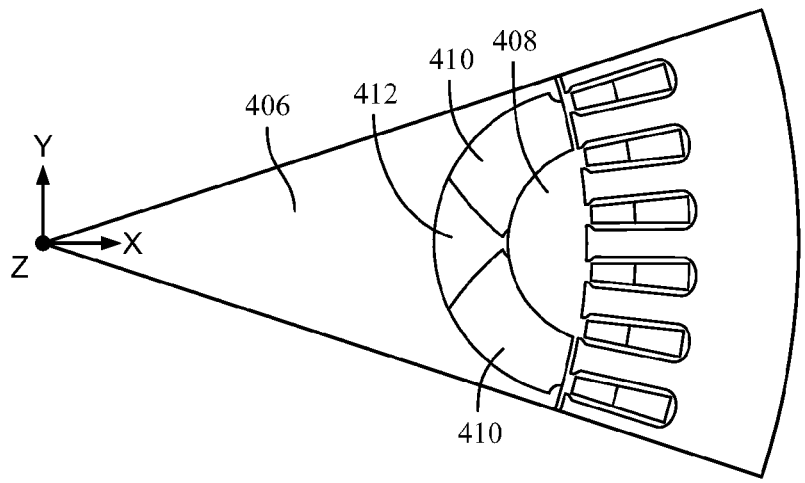
FIG. 4B shows a cross-sectional view of a pole of a VFMM in accordance with one or more embodiments of the invention.
Figure 4C:
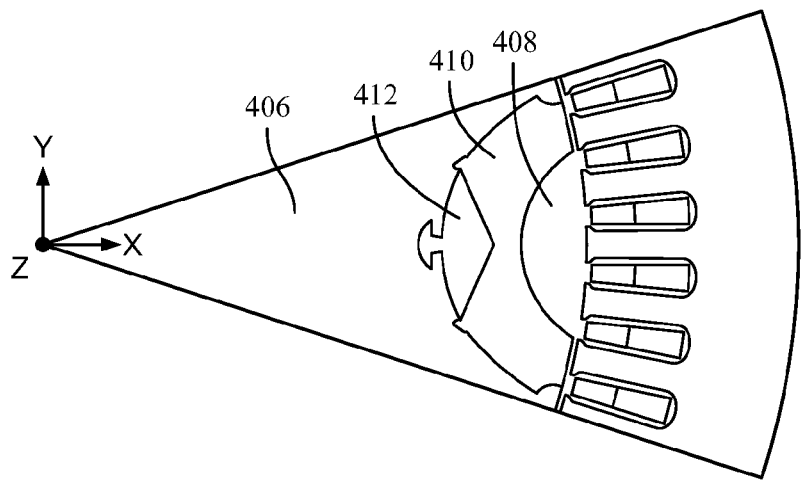
FIG. 4C shows a cross-sectional view of a pole of a VFMM in accordance with one or more embodiments of the invention.

According to one or more embodiments, other configurations may also be used to help directing the magnetic flux toward the soft magnet. For example, each of FIGS. 4B and 4C shows a pole of a rotor where a high-permeable part (412) (e.g., silica steel such as M19) may be disposed in between a soft magnet (410) to direct the magnetic flux toward the soft magnet (410). In the example of FIG. 4B, the high-permeable part (412) may divide the soft magnet (410) into two segments. This way, the high-permeable part (412) is disposed next to more than one segment of the soft magnet (410). On the other hand, in the example of FIG. 4C, the high-permeable part (412) may not divide the soft magnet (410). In FIGS. 4B and 4C, the curved part may be interposed between a first non-magnetic and non-conductive material (406) and a second non-magnetic and non-conductive material (408).

Figure 5:
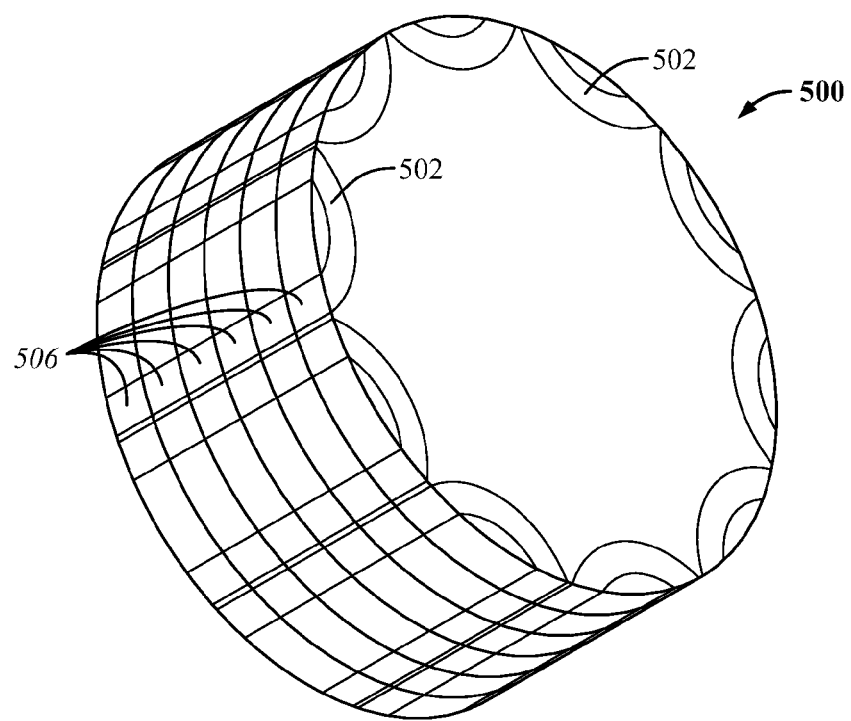
FIG. 5 shows a three-dimensional view of a VFMM rotor in accordance with one or more embodiments of the invention.

According to one or more embodiments, a soft magnet in a pole may include a plurality of soft magnet segments disposed next to each other. For example, as shown in FIG. 5, a soft magnet (502) in a rotor (500) may include a plurality of soft magnet segments (506) disposed next to each other in a direction along the rotational axis of rotor.

According to one or more embodiments, an advantage of having multiple soft magnet segments (506) in a pole over having a single soft magnet is reducing eddy currents in the soft magnet during the VFMM operation as well as more defined control of magnetic field orientation inside the VFMM. When the soft magnet or other conductive components of the VFMM are in a time-varying magnetic flux such as an AC magnetic flux, eddy currents are induced in the soft magnet and in other conductive components of the VFMM. Eddy currents in the soft magnet produce heat. Using multiple soft magnet segments (506) helps to reduce the eddy currents because small airgaps at the interface of adjacent soft magnet segments (506) stop the eddy currents from conducting between the adjacent soft magnet segments (506). Thus, the eddy currents and resistive losses will be reduced. From reading the embodiments of this disclosure, one of ordinary skill in the art will understand the number of soft magnet segments (506) may be chosen depending on a specific design and function of the VFMM.

According to one or more embodiments, the soft magnet (402, 410) or high-permeable parts (404, 412) shown in FIGS. 4A-4C may also include a plurality of segments, for example in a direction along the rotational axis of the rotor to reduce the eddy currents.

Figure 6:
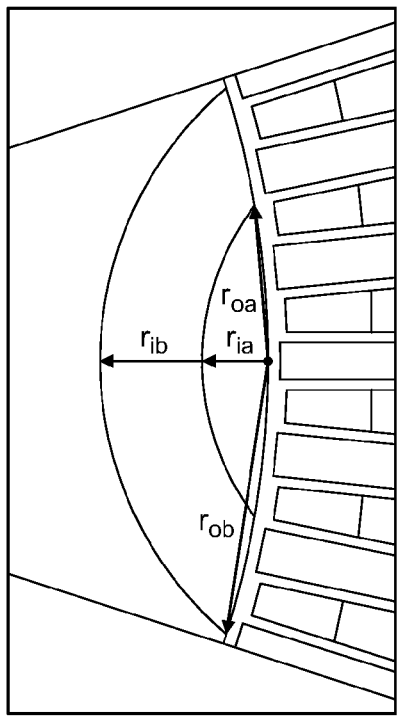
FIG. 6 shows magnetization data based on magnet geometry for various configurations of the curved design.

FIG. 6 shows magnetization data based on magnet geometry for various configurations of the curved design. For each working example presented, the data is calculated based on the magnet geometry dimensions in millimeters (mm), the pulsating current (Id) in Amperes (A), the field (H) in kiloAmperes per meter (kA/m), and magnetization (MS) percentage. In all of the cases listed in the table for the various configurations, AlNiCo 5 DG is used.

As mentioned above, based on the fact that the eclipse ratio of the inner layer is not equal to the outer layer, the thickness of the magnet is not uniform throughout the magnet in the curved design. Therefore, all four terms of the geometry ($r_{ia}$, $r_{oa}$, $r_{ib}$, $r_{ob}$) are required to be considered to obtain the magnetization data. Note that the area of the magnet stayed constant in all variations of the configuration.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A multi-pole rotor of a variable-flux memory motor (VFMM), comprising:
   a plurality of poles, each comprising:
   a curved soft magnet, comprising:
   a first curved soft magnet toward the inner periphery of the soft magnet; and
   a second curved soft magnet toward the outer periphery of the soft magnet, wherein
   an outer periphery of the curved soft magnet is toward the rotational axis of the rotor;
   a first non-magnetic and non-conductive material disposed on the outer periphery of the curved soft magnet; and
   a second non-magnetic and non-conductive material disposed on an inner periphery of the curved soft magnet.

2. The multi-pole rotor according to claim 1, wherein a magnetic permeability of the first curved soft magnet is higher than a magnetic permeability of the second curved soft magnet.

3. The multi-pole rotor according to claim 1, wherein the rotor does not include a hard magnet.

4. The multi-pole rotor according to claim 1, wherein the soft magnet comprises a plurality of magnet segments disposed next to each other.

5. The multi-pole rotor according to claim 4, wherein the magnet segments are disposed next to each other in a direction along the rotational axis of the rotor.

6. The multi-pole rotor according to claim 1, wherein the thickness of the curved soft magnet is not uniform along the length of the magnet.

7. A variable-flux memory motor (VFMM) comprising the rotor of claim 1.

8. A multi-pole rotor of a variable-flux memory motor (VFMM), comprising:
   a plurality of poles, each comprising:
      a soft magnet;
      two high-permeable parts disposed on opposite sides of the soft magnet, wherein
         the soft magnet and the two high-permeable parts create a curved part, and
         an outer periphery of the curved part is toward the rotational axis of the rotor;
   a first non-magnetic and non-conductive material disposed on the outer periphery of the curved part; and
   a second non-magnetic and non-conductive material disposed on an inner periphery of curved part.

9. The multi-pole rotor according to claim 8, wherein the rotor does not include a hard magnet.

10. The multi-pole rotor according to claim 8, wherein the soft magnet comprises a plurality of magnet segments disposed next to each other.

11. The multi-pole rotor according to claim 10, wherein the magnet segments are disposed next to each other in a direction along the rotational axis of the rotor.

12. The multi-pole rotor according to claim 8, wherein the two high-permeable parts are M19.

13. A multi-pole rotor of a variable-flux memory motor (VFMM), comprising:
   a plurality of poles, each comprising:
      a soft magnet;
      a high-permeable part disposed adjacent to the soft magnet, wherein
         the soft magnet and the high-permeable part create a curved part,
         an outer periphery of the curved part is toward the rotational axis of the rotor,
         the soft magnet comprises a plurality of magnet segments, and
         the high-permeable part is disposed next to more than one segment of the soft magnet.

14. The multi-pole rotor according to claim 13, wherein the rotor does not include a hard magnet.

15. The multi-pole rotor according to claim 13, wherein the plurality of magnet segments are disposed next to each other.

16. The multi-pole rotor according to claim 15, wherein the magnet segments are disposed next to each other in a direction along the rotational axis of the rotor.

17. The multi-pole rotor according to claim 15, wherein the rotor does not include a hard magnet.

* * * * *